(12) United States Patent
Schenck zu Schweinsberg et al.

(10) Patent No.: US 10,302,037 B2
(45) Date of Patent: May 28, 2019

(54) METHOD FOR CONTROLLING METERING OF FUEL

(71) Applicant: Robert Bosch GmbH, Stuttgart (DE)

(72) Inventors: Alexander Schenck zu Schweinsberg, Moeglingen (DE); Achim Hirchenhein, Bietigheim-Bissingen (DE); Klaus Joos, Walheim (DE); Werner Hess, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/557,894

(22) PCT Filed: Feb. 12, 2016

(86) PCT No.: PCT/EP2016/053016
§ 371 (c)(1),
(2) Date: Sep. 13, 2017

(87) PCT Pub. No.: WO2016/146310
PCT Pub. Date: Sep. 22, 2016

(65) Prior Publication Data
US 2018/0051643 A1 Feb. 22, 2018

Related U.S. Application Data

(63) Continuation of application No. PCT/EP2016/053016, filed on Feb. 12, 2016.

(30) Foreign Application Priority Data

Mar. 16, 2015 (DE) .................. 10 2015 204 686

(51) Int. Cl.
*F02D 41/24* (2006.01)
*F02D 41/20* (2006.01)
(Continued)

(52) U.S. Cl.
CPC .......... *F02D 41/20* (2013.01); *F02D 41/401* (2013.01); *F02D 41/2467* (2013.01);
(Continued)

(58) Field of Classification Search
CPC ........ F02D 41/2467; F02D 2041/2055; F02D 2041/2058; F02D 2200/0618
(Continued)

(56) References Cited

U.S. PATENT DOCUMENTS 5,433,109 A * 7/1995 Mayer-Dick ............ F02D 41/20
73/114.49
5,592,921 A 1/1997 Rehbichler
(Continued)

FOREIGN PATENT DOCUMENTS

DE 4308811 A1 1/1994
DE 19821046 A1 11/1999
(Continued)

OTHER PUBLICATIONS

International Search Report for PCT/EP2016/053016, dated May 11, 2016.

*Primary Examiner* — Erick R Solis
(74) *Attorney, Agent, or Firm* — Norton Rose Fulbright US LLP; Gerard Messina

(57) ABSTRACT

A method is described for controlling the metering of fuel. A feature, which characterizes the switching point in time of a valve, is ascertained based on a measured signal curve. The feature is fed as an actual variable to a controller. A criterion of the feature is ascertained, the controller taking the criterion of the feature into account.

10 Claims, 3 Drawing Sheets

(51) Int. Cl.
*F02D 41/40* (2006.01)
*F02D 41/14* (2006.01)

(52) U.S. Cl.
CPC ........... *F02D 2041/1422* (2013.01); *F02D 2041/202* (2013.01); *F02D 2041/2055* (2013.01); *F02D 2041/2058* (2013.01); *F02D 2200/0618* (2013.01); *Y02T 10/44* (2013.01)

(58) Field of Classification Search
USPC .................................................. 701/105
See application file for complete search history.

(56) References Cited

U.S. PATENT DOCUMENTS

| | | | | |
|---|---|---|---|---|
| 2005/0146408 A1* | 7/2005 | Traversa | ........... | F02D 41/20 335/220 |
| 2009/0132180 A1* | 5/2009 | Pearce | ........... | F02D 41/20 702/38 |
| 2015/0114099 A1* | 4/2015 | Qiao | ........... | F02D 41/20 73/114.49 |
| 2015/0226148 A1* | 8/2015 | Beer | ........... | F02D 41/247 123/480 |
| 2016/0237937 A1* | 8/2016 | Kusakabe | ........... | F02D 41/20 |
| 2017/0114746 A1* | 4/2017 | Denk | ........... | F02D 41/2467 |
| 2017/0314494 A1* | 11/2017 | Rupp | ........... | F02D 41/2438 |
| 2018/0230932 A1* | 8/2018 | Hauser | ........... | F02D 41/20 |

FOREIGN PATENT DOCUMENTS

| | | |
|---|---|---|
| DE | 102006059624 A1 | 6/2008 |
| JP | H0395602 A | 4/1991 |
| JP | H0735005 A | 2/1995 |
| JP | H0816205 A | 1/1996 |
| JP | H08506642 A | 7/1996 |
| JP | 2014055571 A | 3/2014 |
| JP | 2014234922 A | 12/2014 |
| WO | 9603758 A1 | 2/1996 |
| WO | 2005066477 A1 | 7/2005 |

* cited by examiner

METHOD FOR CONTROLLING METERING OF FUEL

FIELD OF THE INVENTION

The present invention is directed to a method according to the definition of the species of the independent claim. The subject matter of the present invention is also a computer program, a machine-readable memory medium and a control unit.

BACKGROUND INFORMATION

A method and a device for controlling a solenoid valve-controlled injection are discussed in DE 43 08 811. Here, the switching point in time of a solenoid valve is determined by evaluating the current flowing through the consumer. For this purpose, discrete value pairs are ascertained for the current and the point in time. The intersection point of two best-fit lines defines the switching point in time of the valve. This intersection point serves as a feature, which characterizes the switching point in time. The point in time, in particular, at which the intersection point lies, serves as the switching point in time.

The ascertained switching point in time is used for controlling the fuel metering.

Solenoid valves for fuel injection in internal combustion engines are normally control-operated. The solenoid valve is referred to below as a valve. The valves are normally an essential component of the injectors, which meter the fuel as a function of the activation of the valves into the combustion chamber or into the intake manifold. Controlled methods are also used in order to compensate for injector-specific differences in the opening behavior and closing behavior of the valves. In these methods, the opening point in time and/or closing point in time of the valve is detected and this point in time or a variable derived therefrom is adjusted to a predefined value.

The open time of the valve may be used as an actual variable or setpoint variable for the adjustment. The open time is the period of time during which the valve is opened. This is calculated based on the activation period for the valve and on the opening delay time and the closing delay time. The opening delay time corresponds to the interval between the activation start and the opening point in time. The closing delay time corresponds to the interval between the end of the activation and the closing point in time.

The determination of the closing point in time and the opening point in time is essential for the adjusted or adapted operation. The point in time at which the valve needle reaches its seat and the fuel flow through the injector is interrupted is referred to as the closing point in time. The point in time at which the valve needle unblocks the fuel flow through the injector is referred to as the opening point in time. The term switching point in time is used below for the terms closing point in time and opening point in time.

The basis for the calculation of the switching point in time is an electrical signal measured after the activation of the valve. In this calculation, the coil voltage present at the valve or the current flowing through the valve may be used, for example. A particular feature, which is ascertained via a suitable detection method, is formed on the measured signal curve at the switching point in time. In the specific embodiment according to the preceding related art, the current curve has a kink.

The detection of the switching point in time exhibits a different quality or definition as a function of the properties of a valve and of the boundary conditions under which the valve is operated. The spring forces, the friction, the magnetic circuit, adhesive forces and additional variables, in particular, determine the properties of the valve. The pressure, the temperature, the media properties such as, for example, the viscosity, the setpoint quantity and additional variables determine the boundary conditions.

The controllers used for adjusting the feature must be configured in such a way that they may achieve the desired setpoint value rapidly, but do not oscillate too severely or become unstable. The design of the controller in this case is always a compromise, since both clear and, therefore, precise switching point in times, as well as weak and, therefore erroneous switching points in time must be expected. If, in the case of a weak, i.e., erroneous switching point in time, a high control amplification is selected, this may result in overshooting or in control instability. Then again however, in the case of a clear switching point in time, a high control amplification is desirable, so that a rapid adjustment is possible.

SUMMARY OF THE INVENTION

The device according to the present invention and the method according to the present invention including the features of the independent claims, have the advantage over the related art that the control behavior is significantly improved. A significant improvement of the control behavior results from the fact that weak, and therefore potentially erroneous, switching points in time do not interfere or interfere only weakly in the control. As a result, controller oscillations due to isolated outliers resulting from a reduced control amplification in weak switching points in time may be prevented or reduced. At the same time, a high control amplification and therefore a rapid adjustment is possible in the case of clear switching points in time.

This is achieved, for example, in that an additional evaluation of the measured signal curve takes place to the effect that for each switching point in time determination, a criterion for the quality and/or the characteristic strength of the switching point in time is also calculated. The criterion may be ascertained based on the measured signal curve. This means, the same signal used for determining the switching point in time is also employed for ascertaining the criterion. Alternatively, a second measuring signal may also be used.

It is particularly advantageous if the behavior of the controller is selected as a function of the criterion. This criterion, which characterizes the quality of the switching point in time, is used in order to take weak, and therefore rather less certainly determined switching points in time, unweighted or only weakly weighted into account in a subsequent control. Switching points in time, which are ascertained with high quality, are adjusted with great control amplification.

The control may be provided as an adaptation of control values or a specification of the control value based on the deviation between an actual value and a setpoint value of the feature. In the case of adaptation, the control values, which may be stored in a characteristics map, are learned as a function of the deviation between a measured feature and an expected feature.

It is particularly advantageous if one signal or a selection of the following signals is used as the criterion: a gradient change of the signal curve at the switching point in time, a greater derivation of the signal curve at the switching point in time and/or a filtered signal curve at the switching point in time. The signal curve is understood here to mean not only the measured signal curve, but also a signal curve calculated from the measured signal curve. The signal curve may be obtained from the measured signal curve, in particular, with the aid of a non-linear operation.

In another aspect, the present invention relates to program code, together with processing instructions for creating a computer program executable on a control unit, in particular, source code with compiler instructions and/or linking instructions, the program code producing the computer program for executing all steps of one of the described methods, when it is converted, according to the processing instruction, into an executable computer program, i.e., in particular, is compiled and/or linked. This program code may be provided, in particular, in the form of source code, which is downloadable, for example, from a server on the Internet.

BRIEF DESCRIPTION OF THE DRAWINGS

Exemplary embodiments of the present invention are depicted in the drawings and explained in greater detail in the following description.

BRIEF DESCRIPTION OF THE DRAWINGS

Figure 1:
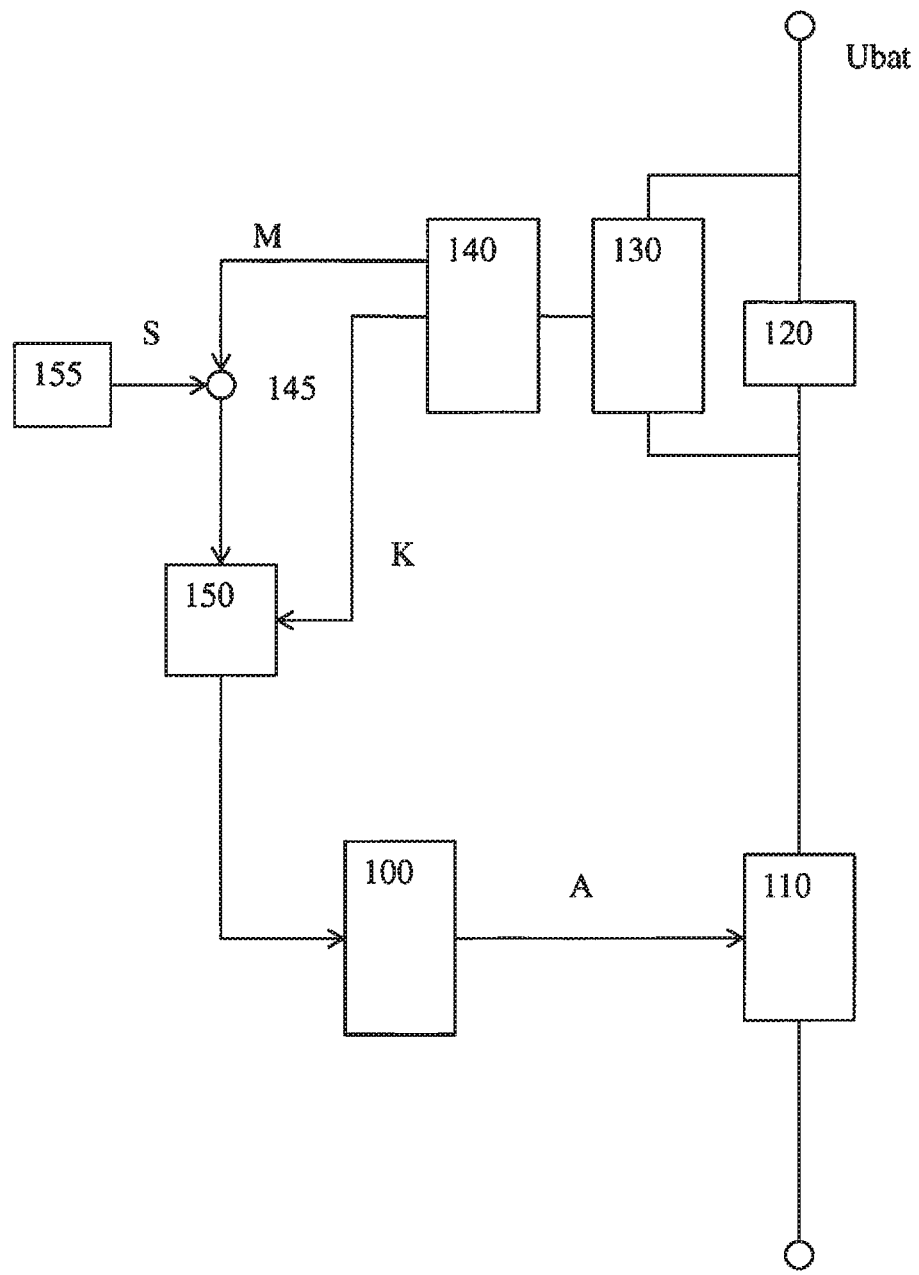
Figure 2:
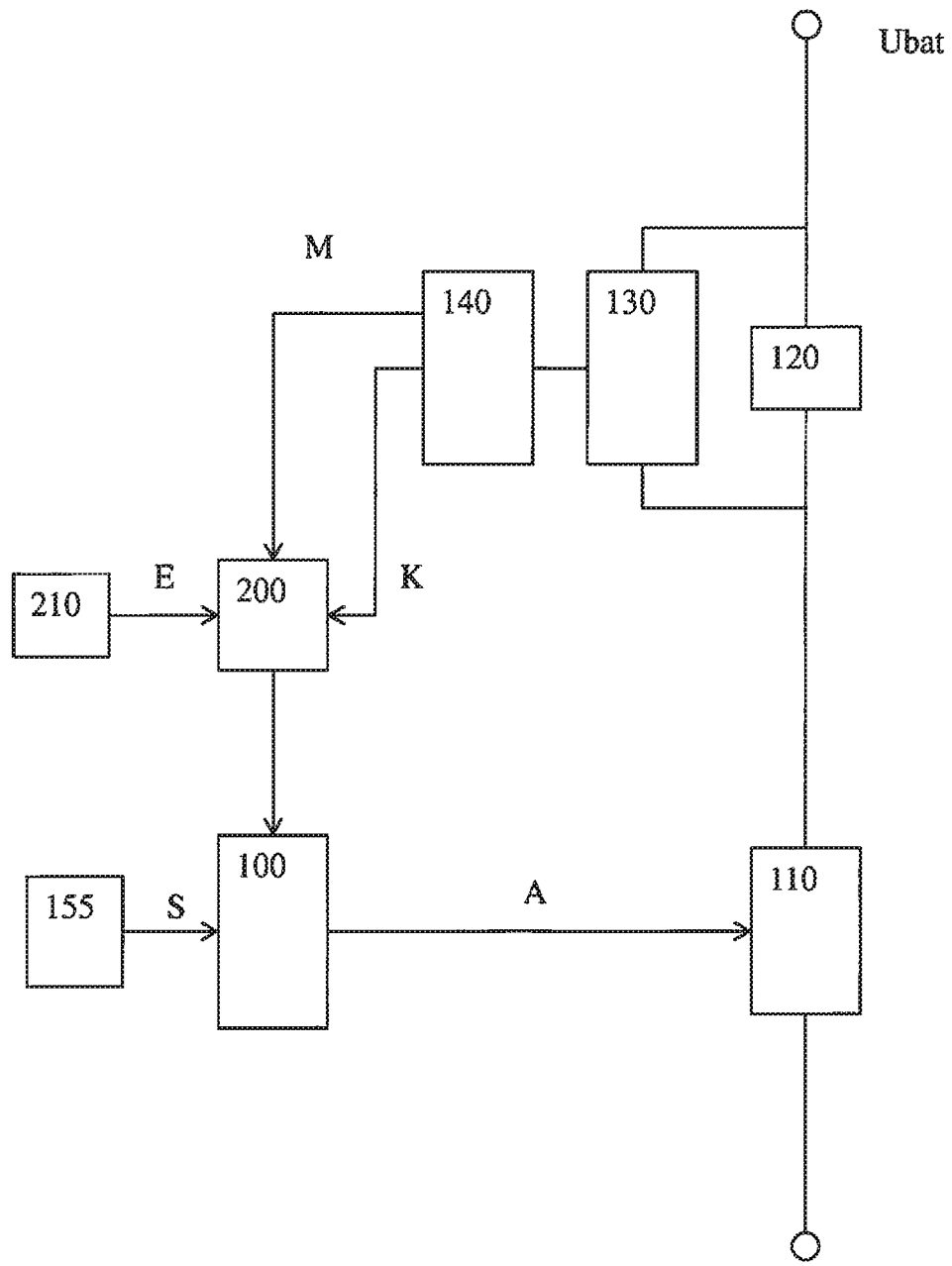
Figure 3:
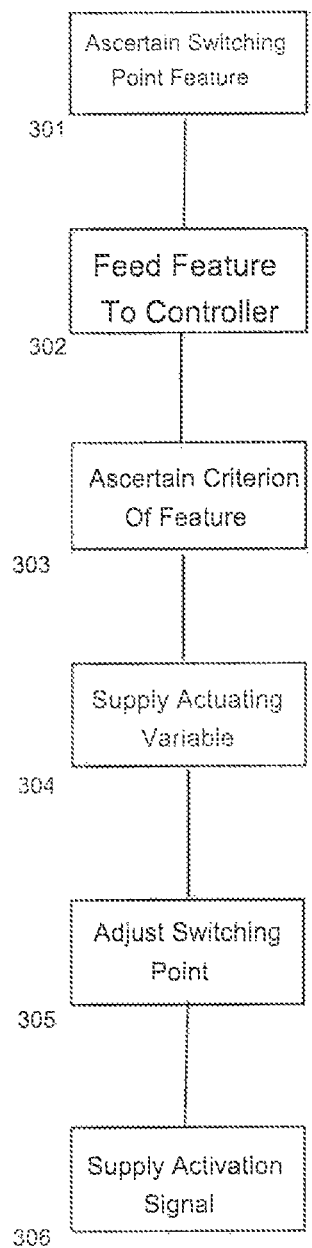

FIG. 1 shows a block diagram of a first embodiment.
FIG. 2 shows a block diagram of a second embodiment.
FIG. 3 shows a flow diagram according to an embodiment of the present invention.

DETAILED DESCRIPTION

A device for controlling the fuel metering of an internal combustion engine is depicted in FIG. 1. Only the essential elements are plotted. The positive terminal Ubat of the battery is connected via a series connection of an electromagnetic consumer 120 and a switching arrangement 110 with a ground connection of the battery. A measuring arrangement detects the voltage present at the consumer. A feature ascertainment 140 evaluates the signal curve of measuring arrangement 130. On the one hand, feature ascertainment 140 applies a feature signal M to a first input of a linking point 145 and, on the other hand, applies a criterion K to a controller 150. Output signal S of a setpoint value specification 155 is present at the second input of linking point 145. The output signal of linking point 145 arrives at the input of controller 150. Controller 150 acts on a control unit 100, which applies an activation signal A to the switching arrangement 110 based on the output signal of controller 150.

The arrangement of electromagnetic consumer 120 and of switching arrangement 110 is indicated only as an example. They may also be situated in a different order. Furthermore, additional switching arrangement may be provided. In another embodiment, it may be provided that the measuring arrangement does not, as depicted, detect the voltage which drops at the consumer, but detects rather the current which flows through the consumer with the aid of a resistor.

This specific embodiment involves an adjustment of the actual value of the feature to a setpoint value for the feature. This unit operates as follows: Based on the signals of controller 150, control unit 100 calculates activation signals A to be applied to switching arrangement 110. This switching arrangement 110 may be implemented as a field effect transistor. However, other implementations such as, for example, transistors, are also possible. Current is applied to electromagnetic consumer 120 by the actuation of switching arrangement 110.

The electromagnetic consumer may be an electromagnetic valve. This includes a movable valve needle, which assumes different positions as a function of whether a current flows through the consumer. If the switching arrangement is actuated, the valve needle moves to its new position after a certain period of time. At this point in time, which is referred to as a switching point in time, the voltage curve exhibits a kink. This means that the voltage changes very rapidly. Immediately before and after the kink, the voltage runs virtually linearly over time.

The voltage curve in the area of the switching point in time may be described in a first approximation with the aid of two straight lines. The voltage increase or the gradient of the two straight lines before and after the kink differ significantly. In the kink, the voltage increase or the differentiated current curve changes significantly.

In the specific embodiment depicted, measuring arrangement 130 and feature ascertainment 140 are provided for detecting the switching point in time. The switching point in time is recognized by a corresponding evaluation in feature ascertainment 140. In addition to the evaluation of a kink in the voltage curve, it is also possible to evaluate other features. Feature ascertainment 140 indicates a point in time at which the valve reaches its end position, at linking point 145. Setpoint value specification 155 specifies a setpoint value S, which corresponds to the desired point in time of the switching point in time. Feature M serves as an actual value of a controller 150, which adjusts the feature to a predefined setpoint value S. Based on the deviation of the feature from its setpoint value, controller 150 specifies a actuating variable to control unit 100.

The control unit then activates switching arrangement 110 accordingly as a function of this actuating variable.

A corresponding approach is already in use today in modern vehicles. In this case, the switching point in time of electromagnetic consumer 120 during the start of the injection or the switching point in time which defines the end of the injection may be fed as a feature to a control. In one advantageous embodiment, both variables may also be subjected to a control. Alternatively or in addition to the switching point in time, other features, which characterize the injection operation, may also be subjected to a corresponding control. Such features include, for example, the points in time at which the valve needle or other elements of the injector reach certain positions. In this case, the points in time may also serve as features, at which certain voltage values or current values are reached.

The open time of the valve may be used as the feature. The open time is the period of time during which the valve is opened. This period is calculated based on the activation period for the valve and on the opening delay time and closing delay time. The opening delay time corresponds to the interval between the start of activation and the opening point in time. The closing time delay corresponds to the interval between the end of activation and the closing point in time. This means that the open time is a function of the switching time.

The problem is that the feature exists with varying quality. If the gradient of the current curve or voltage curve in the kink changes only marginally, i.e., the kink is only weakly pronounced, then the switching point in time has a minimal quality. This means that the switching point in time may be ascertained only with minimal accuracy.

The subsequent controlling in controller 150, if it takes place based on such a feature having minimal quality, may result in instabilities in the control circuit.

For this reason, it is provided according to the present invention that feature ascertainment 140 also provides a criterion K, which indicates the quality of the feature. The criterion may be ascertained based on the signal curve. The signal curve of the voltage or of the current measured with the aid of measuring arrangement 130 may be used in the process. A signal curve calculated from the measured signal curve may also be used for ascertaining the criterion. The signal curve may be obtained, in particular, from the measured signal curve with the aid of a non-linear operation.

It is particularly advantageous if a gradient change of the signal curve at the switching point in time, a greater derivation of the signal curve at the switching point in time and/or a filtered signal curve at the switching point in time are used as the criterion.

Possible criteria for the quality may be one or multiple of the following variables. Thus, for example, the gradient change at the point in time of the switching point in time or a variable derived therefrom may be used. If the gradient change is large, the criterion assumes a high value. If the gradient change is small, the criterion assumes a low value. This is an indication that the quality of the signal is poor. A derivation or a higher derivation or a frequency-filtered signal at the switching point in time may also be used as the criterion. Alternatively, a signal derived from the measured signal may also be used.

In the following, the criterion is taken into account by controller 150 when ascertaining the actuating variable. It is provided, for example, that the controller amplification is increased or reduced as a function of the criterion K. For example, in the case of a high value of the criterion, i.e., of a high quality of the feature, a higher controller amplification is used for this purpose, than in the case of a low value of the criterion.

Another embodiment of the approach according to the present invention is depicted in FIG. 2. The two specific embodiments are in large part identical. Identical blocks are similarly designated. This embodiment is an adaptation or a method for learning characteristics map values. Only the differences relative to FIG. 1 are described below. Feature M and criterion K, which are determined by feature ascertainment 140, arrive at an adaptation 200. Expected value E for the feature is present at the second input of adaptation 200. The output signal of adaptation 200 is applied to control unit 100. Setpoint value specification 155 applies setpoint value S for the feature to control unit 100.

In contrast to FIG. 1, a control of the switching arrangement in this case is provided as a function of setpoint value S. The control includes essentially a characteristics map, in which activation signal A is stored as a function of setpoint value S or as a function of additional other variables. Here, too, feature M is ascertained accordingly as in FIG. 1 and is fed to adaptation 200 as an actual value. Adaptation 200 compares the ascertained feature with expected value E, which is provided by specification 210. If the two values deviate from one another, adaptation 200 then provides a value to the characteristics map in control unit 100 in order to adapt the control unit accordingly, i.e., to change it in such a way that the actual value of the feature approaches expected value E.

Adaptation 200 may also be referred to as a controller, this controller specifying a correction value for a characteristics map, rather than an actuating variable for an actuator.

This means that feature M is compared in adaptation 200 with the ideal value for the feature, which is provided by specification 210. If the values differ, adaptation 200 then corrects the characteristics map of the control unit in such a way that feature M approaches the ideal value.

In such an approach, criterion K may be used to weight feature M as a function of the value of the criterion and, therefore, of the quality of the feature ascertainment. This means that a weighted ascertainment of the feature takes place, which is used to adapt the characteristics map.

Thus, for example, weighted feature Mw may be calculated according to the following formula based on multiple ascertained features Mn and corresponding criteria Kn.

$$Mw=(\Sigma kn)^{-1}*\Sigma Mn*Kn$$

The thus averaged value is then used by adaptation 200 to calculate the value with which the characteristics map is adapted in control unit 100.

FIG. 3 is a flow diagram for a method for controlling the metering of fuel according to the present invention. In step 301, a feature is ascertained which characterizes the switching point in time of a valve or is a function of the switching point in time based on a measured signal curve. The switching point reflects a time at which a mechanical element of the valve assumes a predetermined position. In step 302, the feature is fed as an actual variable to a controller. In step 303, a criterion of the feature is ascertained, with the controller taking into account the criterion of the feature. The criterion measures a quality of the feature. In step 304, the controller supplies an actuating variable representing a control amplification having a magnitude proportional to the criterion. In step 305, the switching point of the feature is adjusted in accordance with the control amplification so that the adjusting of the switching point becomes more rapid as the control amplification increases. In step 306, an activation signal is supplied that controls an operation of the valve, the activation signal being based on the control amplification.

What is claimed is:

1. A method for controlling the metering of fuel, the method comprising:
   ascertaining a feature which characterizes the switching point in time of a valve or is a function of the switching point in time based on a measured signal curve, wherein the switching point reflects a time at which a mechanical element of the valve assumes a predetermined position;
   feeding the feature as an actual variable to a controller;
   ascertaining a criterion of the feature, the controller taking into account the criterion of the feature, wherein the criterion measures a quality of the feature;
   causing the controller to supply an actuating variable representing a control amplification having a magnitude proportional to the criterion;
   adjusting the switching point of the feature in accordance with the control amplification so that the adjusting of the switching point becomes more rapid as the control amplification increases; and
   supplying an activation signal that controls an operation of the valve, the activation signal being based on the control amplification.

2. The method of claim 1, wherein the criterion of the feature describes the characteristic strength of the feature characterizing the switching point in time.

3. The method of claim 1, wherein the criterion is ascertained based on the measured signal curve.

4. The method of claim 1, wherein the behavior of the controller is selected as a function of the criterion.

5. The method of claim 1, wherein in an adaptation, the feature is weighted as a function of the criterion.

6. The method of claim 1, wherein one or a combination of the following signals, a gradient change of the signal curve at the switching point in time, a higher derivation of the signal curve at the switching point in time and/or a filtered signal curve at the switching point in time, are used as the criterion.

7. A computer readable medium having a computer program, which is executable by a processor, comprising:
a program code arrangement having program code for controlling the metering of fuel, by performing the following:
ascertaining a feature which characterizes the switching point in time of a valve or is a function of the switching point in time based on a measured signal curve, wherein the switching point reflects a time at which a mechanical element of the valve assumes a predetermined position;
feeding the feature as an actual variable to a controller;
ascertaining a criterion of the feature, the controller taking into account the criterion of the feature, wherein the criterion measures a quality of the feature;
causing the controller to supply an actuating variable representing a control amplification having a magnitude proportional to the criterion;
adjusting the switching point of the feature in accordance with the control amplification so that the adjusting of the switching point becomes more rapid as the control amplification increases; and
supplying an activation signal that controls an operation of the valve, the activation signal being based on the control amplification.

8. The computer readable medium of claim 7, wherein the controller adapts an actuating variable.

9. A control unit, comprising:
a control device configured for controlling the metering of fuel, by performing the following:
ascertaining a feature which characterizes the switching point in time of a valve or is a function of the switching point in time based on a measured signal curve, wherein the switching point reflects a time at which a mechanical element of the valve assumes a predetermined position;
feeding the feature as an actual variable to a controller;
ascertaining a criterion of the feature, the controller taking into account the criterion of the feature, wherein the criterion measures a quality of the feature;
causing the controller to supply an actuating variable representing a control amplification having a magnitude proportional to the criterion;
adjusting the switching point of the feature in accordance with the control amplification so that the adjusting of the switching point becomes more rapid as the control amplification increases; and
supplying an activation signal that controls an operation of the valve, the activation signal being based on the control amplification.

10. The control unit of claim 9, wherein the controller adapts an actuating variable.

* * * * *